(12) United States Patent
Varga

(10) Patent No.: US 8,009,316 B2
(45) Date of Patent: Aug. 30, 2011

(54) METHODS AND APPARATUS FOR EFFICIENT SHEETSIDE BITMAP PROCESSING USING META-DATA INFORMATION

(75) Inventor: John T. Varga, Longmont, CO (US)

(73) Assignee: Ricoh Production Print Solutions LLC, Boulder, CO (US)

( * ) Notice: Subject to any disclaimer, the term of this patent is extended or adjusted under 35 U.S.C. 154(b) by 956 days.

(21) Appl. No.: 11/925,034

(22) Filed: Oct. 26, 2007

(65) Prior Publication Data

US 2009/0109510 A1 Apr. 30, 2009

(51) Int. Cl.
*G06K 15/00* (2006.01)
(52) U.S. Cl. .................................. 358/1.17; 358/1.16
(58) Field of Classification Search .............. 358/1.16, 358/1.17
See application file for complete search history.

(56) References Cited

U.S. PATENT DOCUMENTS

| | | |
|---|---|---|
| 2002/0087403 A1 | 7/2002 | Meyers et al. |
| 2004/0001631 A1 | 1/2004 | Camara et al. |
| 2005/0041860 A1 | 2/2005 | Jager |
| 2005/0058359 A1 | 3/2005 | Tashman |
| 2006/0072127 A1 | 4/2006 | Herron |
| 2006/0153475 A1 | 7/2006 | Ruggiero |
| 2006/0197999 A1* | 9/2006 | Murakami ............ 358/538 |
| 2006/0209369 A1 | 9/2006 | Yasunaga |
| 2006/0227357 A1* | 10/2006 | Murakami ............ 358/1.13 |
| 2008/0074685 A1* | 3/2008 | Sakamoto ............ 358/1.9 |
| 2008/0273218 A1* | 11/2008 | Kitora et al. ............ 358/1.13 |

* cited by examiner

*Primary Examiner* — Twyler L Haskins
*Assistant Examiner* — Fred Guillermety
(74) *Attorney, Agent, or Firm* — Duft Bornsen & Fishman, LLP

(57) ABSTRACT

Methods and apparatus for using meta-data structures to represent portions of a bitmap memory when generating the sheetside image and when generating a compressed representation of the sheetside image. A table of meta-data structures is maintained with each structure corresponding to a portion of the bitmap memory. Data objects representing a sheetside image are processed by determining which portions the data object would affect, by updating the meta-data structures corresponding to affected portions to indicate whether the affect generates a "compact" type of data or a "non-compact" type of data, and for the "non-compact" types of data writing data to the bitmap memory. For portions having "compact" type of data, the corresponding meta-data structures alone describes the bitmap portion of data. A compressed-bitmap generator then uses the meta-data structures and the portions of the bitmap memory containing "non-compact" data to generate a compressed representation of the sheetside image.

18 Claims, 9 Drawing Sheets

METHODS AND APPARATUS FOR EFFICIENT SHEETSIDE BITMAP PROCESSING USING META-DATA INFORMATION

BACKGROUND

1. Field of the Invention

The invention relates generally to methods and systems in which data objects are rasterized or rendered to generate two-dimensional bitmaps that are then compressed for eventual presentation on a device such as a printer. More specifically, the invention relates to methods and systems for improving efficiency of generating such compressed bitmaps by using meta-data structures to represent data without writing to the bitmap thus reducing utilization of bitmap memory bandwidth.

2. Discussion of Related Art

In a variety of document presentation systems such as printing systems, it is common to generate a bitmap representation of each sheetside image of the document by processing a sequence of data objects. The data objects are typically initially defined in a page description language or other suitable encoding and at some point prior to writing to a bitmap are represented as regions of rectangles of pixels. Typically, the sheetside image is then generated into a bitmap memory as a two dimensional matrix of pixels representing the intended document sheetside image.

As presently practiced in the art, typical sheetside bitmap processing commences by initializing the bitmap memory to all blank (e.g., all zeros). As each data object for the sheetside image is processed, pixels in the bitmap memory are modified (written) to represent the data object appropriately positioned on the sheetside image. Eventually, when all data objects for the sheetside image have been processed, the content of the bitmap memory is compressed to generate a smaller representation of the sheetside image—the compressed bitmap. The compressed bitmap and other compressed bitmaps for other sheetside images of the job or document are often stored for later transmission to the presentation device (e.g., printer or other display devices).

As presently practiced, each data object is processed by writing it to the bitmap—either overwriting the cleared bitmap memory or overwriting data in the bitmap memory written previously by processing of other data objects. For example, an image data object may be processed generating image data in the bitmap memory. A subsequent text data object or other image data object may then be processed such that the generated pixels overlap pixels previously written in processing of the earlier image data object. The previously written pixels of the bitmap are simply overwritten by the new pixels of the later data object.

The processing described above as presently practiced in the art presents a number of performance problems. First, the bitmap memory must be set to zero or cleared of any previous pixel information as the standard starting point in processing each sheetside image. This initial clearing of the bitmap memory requires significant memory bandwidth and processor cycles to write a large volume of memory. In addition, where a sheetside image utilizes a solid background color or a background image (e.g., a watermark) covering large areas of the sheetside image, another significant volume of bitmap memory write operations are required to write the background color or image. Further, some common business applications may generate borders such as concentric rectangles or patterns around the perimeter of a sheetside image for a document again requiring a significant volume of memory write operations. Still further, when a data object represents opaque image data, or a transparency mask, the pixel data within the data object is generally copied from the data object memory into the bitmap memory generating still further memory bandwidth utilization and processing cycles. Lastly, when the sheetside image creation is complete following processing of every data object, the entire sheetside bitmap memory is read so as to generate the compressed data in the compressed bitmap representation of the sheetside bitmap memory. Thus, still further bitmap memory bandwidth utilization and processor cycles are generated.

The above exemplary problems of present techniques are further exacerbated when the bitmap memory includes a color depth such as 8 or 32 bits per pixel rather than a single bit deep binary image (e.g., black and white). Still further, in presentation of full color documents, a sheetside image is typically represented by four bitmaps—one for black and one for each of three primary colors. Still further, highlight colors and/or MICR (e.g., magnetic toner) printing applications may add still further bitmaps. These other common configurations simply multiply the above identified memory bandwidth utilization problems by the number of bitmaps and the color depth of each bitmap. The significant volume of memory operations and processor cycles to generate compressed bitmaps in accordance with present techniques can impose a significant performance bottleneck on the processing of a document to prepare it for transmission to the presentation device (e.g., transmission to a printing system to generate a printed copy of the processed document).

It is evident from the above discussion that an ongoing need exists for improving efficiency in generating compressed bitmaps such as in a printing environment.

SUMMARY

The present invention solves the above and other problems, thereby advancing the state of the useful arts, by providing methods and associated systems utilizing meta-data to represent portions of the bitmap memory. The meta-data structures represent the content of corresponding portions of the bitmap memory in a compact form without requiring writing of the pixels of a data object to the bitmap memory. The compressed bitmap may then be generated using the meta-data structures and only reading data from the bitmap where the meta-data cannot compactly represent the content of the corresponding portion of the bitmap memory. These features and aspects reduce bitmap memory bandwidth utilization in generating the sheetside image and generating the associated compressed bitmap representation thereof by using he compact meta-data representation of portions of the bitmap memory that did not need to be written.

In one aspect hereof, a method is provided for generating a compressed bitmap in a printing environment. The method includes associating a meta-data structure with each portion of a plurality of portions of a bitmap memory wherein each meta-data structure includes a type of data field indicating a type of data associated with said each portion and wherein each meta-data structure includes a data indicator field indicating the data associated with said each portion. The method then includes processing a sequence of data objects defining the content of the bitmap memory. Processing of each data object includes determining which portions of the bitmap memory would be affected by the data object if written to the bitmap memory. Processing further includes for each affected portion: updating the type of data field of the meta-data structure associated with the affected portion to indicate that the type of data is a "compact" type or a "non-compact" type based on the data object and based on the current type of data; updating the data indicator field of the meta-data structure to represent the data object when the type of data field is updated to indicate a "compact" type of data; and writing a corresponding portion of the data object into the affected portion of the bitmap memory when the type of data field is updated to indicate a "non-compact" type of data. For each meta-data structure, the method then determines if the meta-data structure indicates a "non-compact" type of data. Responsive to a determination that the meta-structure indicates a "non-compact" type of data, the method further includes generating compressed data of the compressed bitmap from data in the corresponding portion of the bitmap memory. Responsive to a determination that the meta-data structure does not indicate a "non-compact" type of data, the method further includes generating compressed data of the compressed bitmap based on the data indicator field of the meta-data structure.

Another aspect hereof provides a method for generating a compressed bitmap representation of an uncompressed bitmap memory generated from a plurality of data objects. The method includes defining a plurality of rectangular portions in an uncompressed bitmap memory and associating a different meta-data structure with each portion of the uncompressed bitmap memory. The method further includes processing the plurality of data objects. Processing of each data object includes determining which portions of the uncompressed bitmap memory the data object may affect. For each affected portion, processing further includes determining from information currently in the corresponding meta-data structure whether the affect of the data object on the portion can be represented by information in the corresponding meta-data structure without writing to the portion. Responsive to determining that the portion can be represented without writing to the portion, updating information in the meta-data structure to represent the portion as affected by the data object. Responsive to determining that the portion cannot be represented without writing to the portion, updating information in the meta-data structure to indicate that the meta-data does not represent the portion and writing data derived from the data object to the portion. The method then includes generating a compressed bitmap based on the meta-data structures corresponding to the plurality of portions and using the bitmap memory for any of the portions for which the corresponding meta-data structure indicates that the portion is not represented by the meta-data structure and outputting the compressed bitmap for presentation to user.

DETAILED DESCRIPTION OF THE DRAWINGS

FIGS. 1 through 9 and the following description depict specific exemplary embodiments of the present invention to teach those skilled in the art how to make and use the invention. For the purpose of this teaching, some conventional aspects of the invention have been simplified or omitted. Those skilled in the art will appreciate variations from these embodiments that fall within the scope of the present invention. Those skilled in the art will appreciate that the features described below can be combined in various ways to form multiple variations of the present invention. As a result, the invention is not limited to the specific embodiments described below, but only by the claims and their equivalents.

Figure 1:
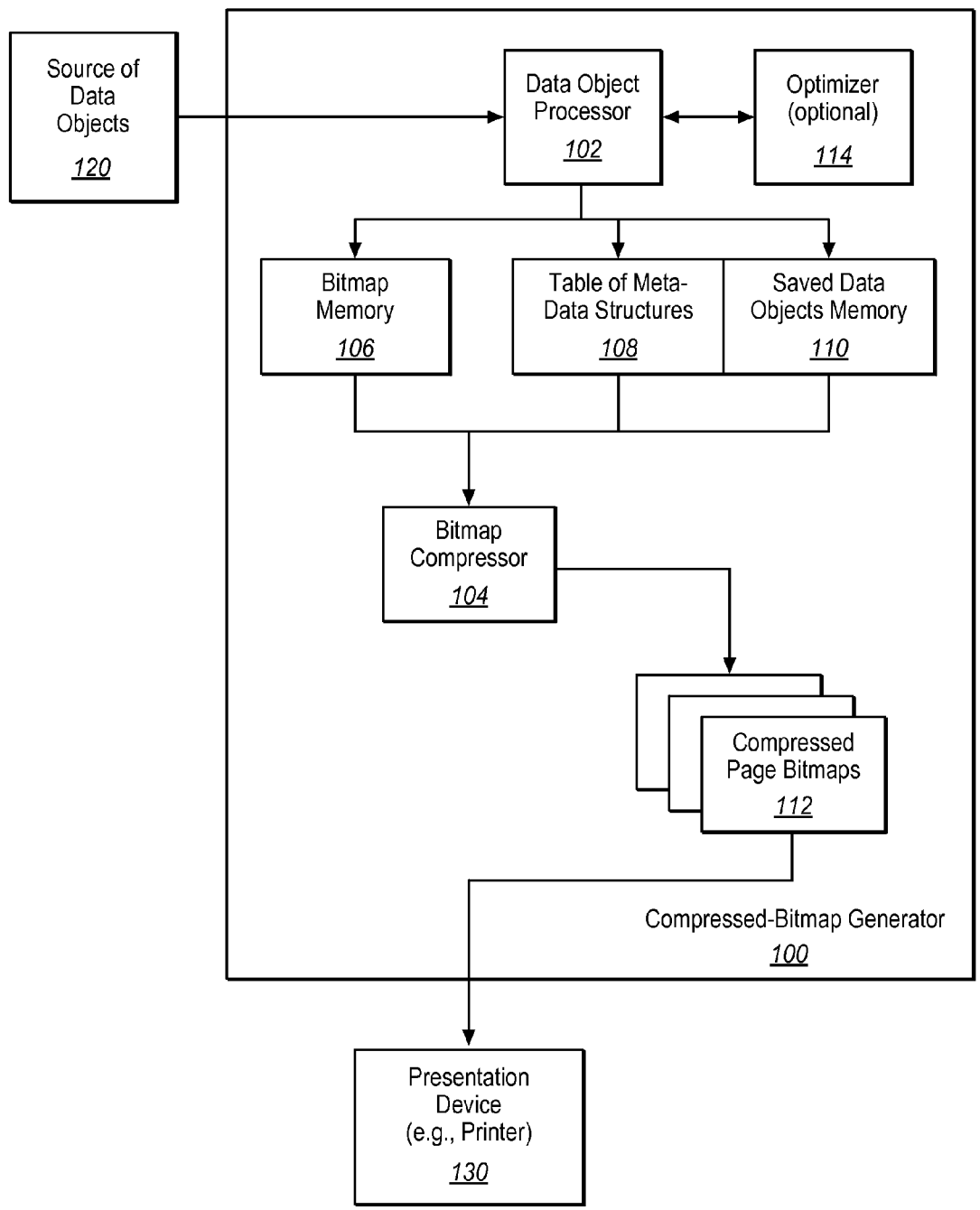
FIG. 1 is a block diagram of an exemplary system that processes data objects to generate compressed bitmaps utilizing meta-data structures in accordance with features and aspects hereof.

FIG. 1 is a block diagram of a system 100 for generating compressed bitmaps. A source of data objects 120 provides a sequence of data objects that represent a sheetside image. Data object processor 102 processes the sequence of data objects to generate a sheetside image represented in bitmap memory 106 and/or in a table of meta-data structures 108. Each sheetside image causes generation of a compressed page bitmap 112 by operation of the bitmap compressor 104. Such a sequence of compressed page bitmaps 112 may represent a stored document or job to be transmitted to a presentation device 130. Presentation device 130 may be, for example, a printer and thus the sequence of compressed page bitmaps 112 may represent a print job or document to be printed by a printer.

Data object processor 102 processes the data objects representing information to be presented on a sheetside image. The data objects as received may be encoded in any of several well-known encoding standards such as page description languages and other document description standards. A data object may represent, for example, text or graphical information to be positioned within the sheetside image of the document. Thus, data object processor 102 is generally operable to process the data object by storing information derived from the data object in the bitmap memory 106 and/or in associated meta-data structures 108.

Prior techniques generally process the data objects by writing all derived data from the objects into bitmap memory 106. By contrast and in accordance with features and aspects hereof, data object processor 102 utilizes a table of meta-data structures 108 to reduce the need to write bitmap memory 106 for each data object and thus reduce utilization of memory bandwidth between data object processor 102 and bitmap memory 106. Reduced utilization of bitmap memory bandwidth improves efficiency of the generation of the corresponding compressed bitmaps by speeding the generation of the uncompressed sheetside image.

Specifically, data object processor 102 stores information relating to portions of bitmap memory 106 in corresponding entries of meta-data structure table 108. Processing of many data objects affecting portions of the bitmap memory 106 may be completed by simply updating information in corresponding entries of meta-data structure table 108. Other or subsequent data objects may require that the bitmap memory 106 be written in accordance with data represented by the data object. Data object processor 102 therefore determines in processing each data object for the sheetside image whether portions of the data object must be written to portions of bitmap memory 106 or whether they may be compactly represented in corresponding meta-data structures within the table of meta-data structures 108 without requiring writing of portions of bitmap memory 106. As discussed further herein below, a significant number of data objects may be represented by compact meta-data structures in table 108 and thus processor 102 may avoid the necessity of writing pixel by pixel information into bitmap memory 106. Some simple data objects such as those representing as a solid color (e.g., a cleared bitmap or a solid color in a portion of the bitmap) may be represented in very compact form in meta-data structures of table 108 without requiring writing of any data in bitmap memory 106. Even more complex data objects such as a transparency masks or an opaque image may be represented compactly in a meta-data structure in table 108.

Processor 102 retains the received data objects in memory 110 and the meta-data structures may indirectly point to the saved data objects that are compactly represented thereby. Again with such a compact representation in the meta-data structure, data object processor 102 may reduce the volume of memory bandwidth utilization required to generate data objects.

Compressed-bitmap generator 100 also includes bitmap compressor 104 to generate compressed data representing a compressed page bitmap 112 following completion of the generation of a sheetside image by data object processor 102. When data object processor 102 has completed processing of a sequence of data objects representing a particular sheetside image, bitmap compressor 104 is then operable to retrieve each meta-data structure and to generate compressed data in a compressed page bitmap 112 based on the information stored in the meta-data structure. Where a meta-data structure provides sufficient information to generate a compressed representation of the corresponding portion of bitmap data, bitmap compressor 104 need not read bitmap memory 106 to generate a portion of the compressed page bitmap 1 12. Where the meta-data structure indicates that the corresponding portion of the bitmap contains the data to be compressed, bitmap compressor 104 reads the indicated portion of bitmap memory 106 to generate the corresponding portions of compressed page bitmaps 1 12.

Figure 2:
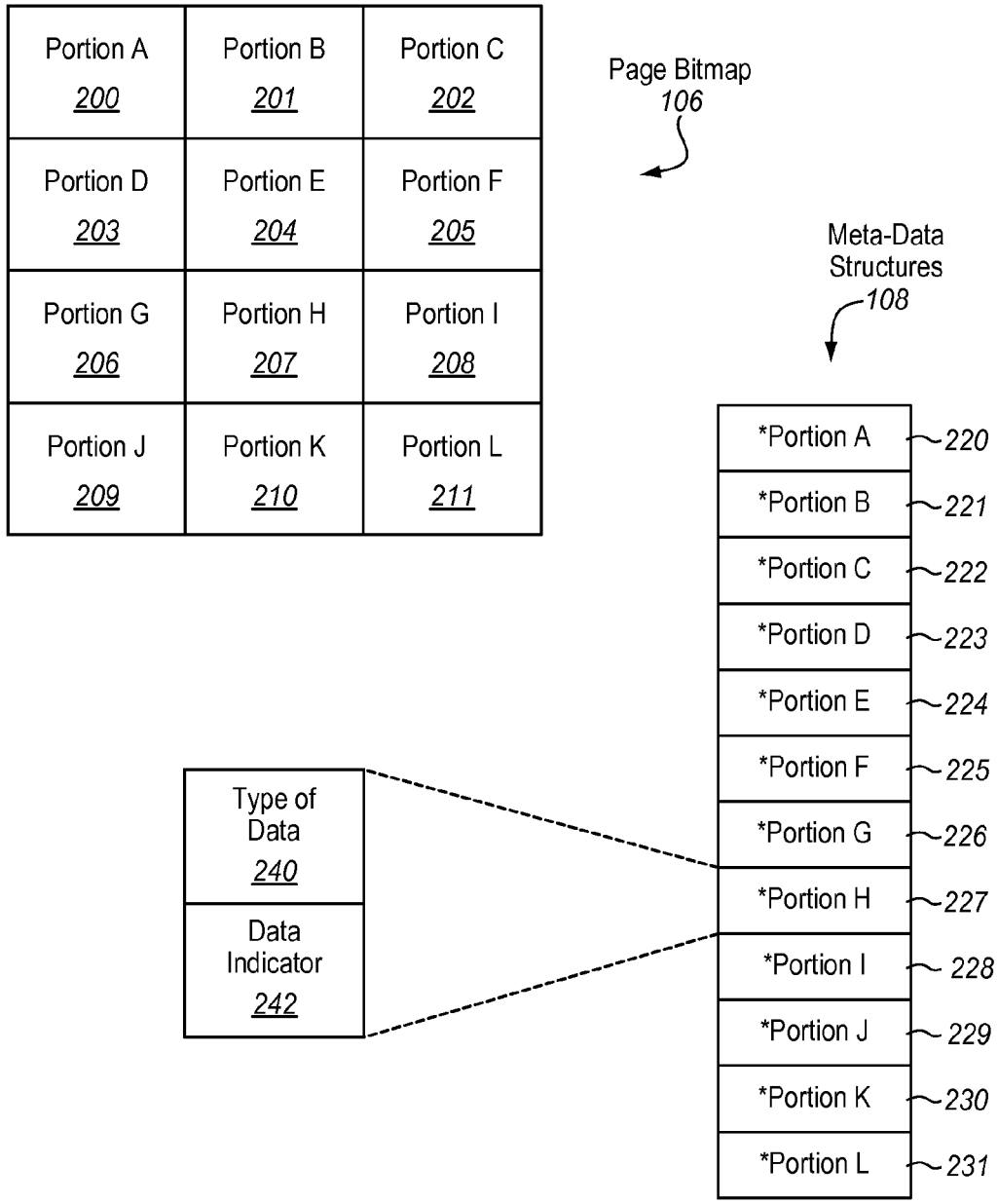
FIG. 2 is a block diagram describing the association of each meta-data structure in a table of such structures with a corresponding portion of the page bitmap memory in accordance with features and aspects hereof.

FIG. 2 is a block diagram describing an exemplary relationship between a plurality of portions of bitmap memory 106 and the table of meta-data structures 108. Bitmap 106 is shown as containing a plurality of identically sized, rectangular portions 200 through 211 ("Portion A" through "Portion L"). Each portion has a corresponding entry (220 through 231) in the table of meta-data structures 108. In particular, meta-data structure table 108 entry 220 ("*Portion A") includes information regarding the corresponding "Portion A" 200 of the bitmap memory 106. In like manner meta-data structure entry 221 ("*Portion B") corresponds to "Portion B" 201 of bitmap memory 106, etc. Each meta-data entry (220 through 231) includes a type of data field 240 and a data indicator field 242. The type of data field 240 indicates a type of data presently associated with the corresponding portion (200 through 211) of bitmap memory 106. Data indicator field 242 points (indirectly) at the saved data object that is presently associated with the portion corresponding to the meta-data structure. In the alternative or in addition, data indicator field 242 may directly encode the data of the data object presently associated with the portion.

Returning again to operation of data object processor 102 of FIG. 1, if the data derived from a data object were written to bitmap memory 106, the data may span one or more portions of the bitmap memory 106. As data object processor 102 processes data objects, for each portion of the bitmap memory 106 that would be affected by writing the data object, the corresponding meta-data structure in table 108 is updated to record information regarding the affect the data object would have on corresponding portions of the bitmap memory 106. For example, if a data object would affect "Portion A" 200 and "Portion B" 201, data object processor 102 updates meta-data structures "*Portion A" 220 and "*Portion B" 221. Depending on the particular new data object and the current data compactly represented by the meta-data structure of a portion of the bitmap, updating the meta-data structures 220 and 221 may suffice to represent the new data object without needing to write data into the bitmap memory portions 200 and 201.

As discussed in further detail herein below, the type of data field 240 of a meta-data structure entry may indicate that the corresponding portion of the bitmap memory is a "compact" type of data or a "non-compact" type of data. A data indicator field 242 represents the data of the corresponding portion in a compact form. Most generally, if the data that would be in a portion of the bitmap memory may be compactly represented in the meta-data structure without requiring that the data be written to the corresponding portion of the bitmap memory, then the type of data for the affected meta-data structure is "compact" and the data indicator field represents the new data for the corresponding portion of the bitmap memory. If the data that would be in a portion cannot be compactly represented in the meta-data structure, the type of data for the affected meta-data structure is "non-compact" and the data object/objects are simply written to the corresponding portion of the bitmap memory. Those of ordinary skill will recognize that these particular "type of data" values ("compact" and "non-compact") are intended mere as exemplary.

More specifically, a "compact" type of data indicates that the data of the corresponding portion of the bitmap is compactly represented by the information in the meta-data structure and hence is not written in the corresponding portion of the bitmap memory. For example the bitmap memory at the start of processing of a sheetside image is logically cleared (e.g., a solid white background often represented as zeros in the bitmap memory). However, the bitmap memory need not be written to clear the sheetside image in accordance with features and aspects hereof. Rather, each meta-data object may compactly represent the cleared state of its corresponding portion of the bitmap by indicating a "compact" type of data with a data indicator value representing a cleared bitmap memory portion. As data objects are processed for the sheetside image, portions of the bitmap and corresponding meta-data structures may be affected by the processed data objects. A "compact" type of data in the meta-data structure for such an affected portion of the bitmap then indicates that some data object has been processed that has affected the corresponding portion of the bitmap and that the affect on the corresponding portion is represented compactly in the meta-data structure by the data indicator field. For example, the data indicator field may indirectly point to the data object in the saved data object memory. Or, for example, the data indicator field may directly represent that data object by an encoded value (such as the color of a rectangular data object that affects the corresponding portion of the bitmap memory). Hence, the portion of the bitmap memory corresponding to a meta-data structure having the "compact" data type has no relevant information written therein thus reducing bitmap memory bandwidth utilization that would be required to write the data objects to the bitmap memory.

A "non-compact" type of data indicates that the data of the corresponding portion of the bitmap cannot be compactly represented in a meta-data structure alone for any of various reasons (i.e., cannot be adequately represented by the data indicator field). In such a case, the data object or objects that affect the corresponding portion of the bitmap memory are simply written to the bitmap memory.

Numerous conditions may arise to preclude a "compact" type of data representation for a portion of the bitmap. Other conditions may arise where, as a matter of design choice, the portion could be represented by either a "compact" type of data or by a "non-compact" type of data in the corresponding meta-data structure. Based on cost/benefit implementation details for a particular application it may be determined that a "compact" representation is not desired. For example, the added computational complexity to compactly represent combinations of data objects overlapping within a portion may be too high although the particular overlapping data could be represented compactly. Or, for example, if image objects are a rarity in a particular application, there may be little benefit in compactly representing image data objects in a "compact" type of data meta-data structure. Or, for example, where image objects are frequent and often overlapping in portions of the bitmap memory (e.g., a photo montage), significant benefits may be realized in assuring that portions with such overlapping image objects are compactly represented whenever possible to avoid using bitmap memory bandwidth to write image data that is likely to be overwritten by a later image data object. These and other heuristics and design choices will be readily apparent enhancements to the features and aspects hereof to optimize the systems and methods for particular applications.

As exemplified in FIG. 2, bitmap memory 106 is logically subdivided into a plurality portions that may all be of equal size. Any suitable number of portions may be predefined in accordance with features and aspects hereof. Thus the number of such portions (200-211), the corresponding number of meta-data structures (221-231) in table 108, and the associated size of each of the portions may be predetermined and statically fixed within the system. Alternatively, as shown in FIG. 1, an optional optimizer element 114 may be operable in system 100 to analyze the efficiency of the number and size of the portions for a particular set of data objects. Based upon such analysis, optimizer 114 may adjust the size and number of such portions and correspondingly adjust the number of meta-data structures in table 108. For certain types of documents or jobs, fewer such portions of larger size may provide optimal results in processing sheetside images. In other types of documents or jobs, a larger number of smaller portions may provide optimal sheetside image processing. Exemplary considerations for such optimizations are discussed further herein below. Where the portions are all of equal shape and size, the association between a meta-data structure (220 through 231) and its corresponding portion (200 through 211) of the bitmap memory 106 may be determined by a simple indexing calculation to associate the meta-data structure by its index position within the table 108 with its corresponding bitmap memory portion. Where the number, size, and/or shape of the bitmap portions are variable, each meta-data structure (220 through 231) may include suitable addressing information to identify its corresponding portion (200 through 211) of the bitmap memory.

Figure 3:
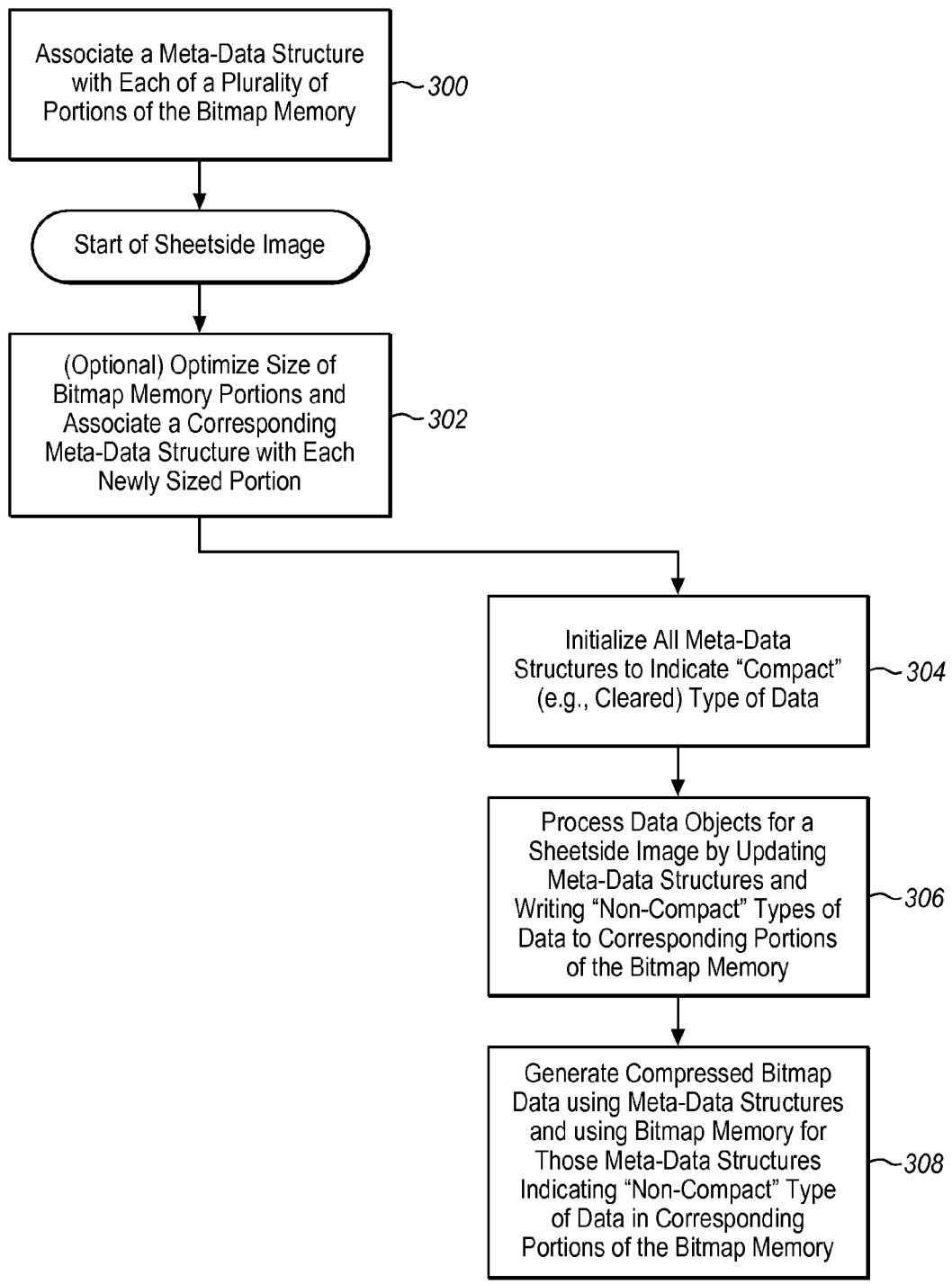
FIG. 3 is a flowchart describing an exemplary method in accordance with features and aspects hereof to process data objects representing a sheetside image utilizing meta-data structures to reduce bitmap memory bandwidth utilization when generating a compressed bitmap representation of each sheetside image.

FIG. 3 is a flowchart generally describing an exemplary method operable, for example, in system 100 of FIG. 1. Step 300 associates a meta-data structure with each of a plurality of portions of the bitmap memory. As noted above, the number of such portions, and hence the number of corresponding meta-data structures, may be statically predetermined or may be dynamically determined by optimization analysis in the processing of sheet side images. Step 300 therefore represents any suitable determination of an initial number of such portions and initialization of corresponding meta-data structures. Steps 302 through 308 are then performed to process data objects representing a sheetside. By repeating steps 302 through 308, multiple sheetsides of a job may be similarly processed to generate a corresponding sequence of compressed bitmaps for storage and later presentation to a user.

Step 302 represents optional processing that may be performed prior to generating each sheetside image. The optional optimization processing of step 302 determines an optimal number and size of portions in the bitmap memory for generating the compressed bitmaps. For example, where a sequence of sheetside images contains large portions of data that may be compactly represented, the size of each portion may be increased and hence the number of such portions and corresponding meta-data structures may be reduced. Thus larger portions of "compact" data may be quickly and easily encoded into compact representation in fewer meta-data structures. Conversely, other types of documents or jobs may include sheetside images having more randomly scattered portions of "compact" and "non-compact" types of data. In such a scenario, the optimization of step 302 may decrease the size of the portions of bitmap memory and hence increase the number of such portions and the corresponding number of meta-data structures. This allows for compact encoding of more "compact" portions of the bitmap memory though each portion may be smaller. A suitable lower limit on the size of the portions may be predetermined such that the processing reverts to standard full bitmap processing where the meta-data structures would be too numerous to provide any useful performance increase.

For example, the processing of step 302 may include pre-processing (scanning) of each of the data objects that represent the sheetside image. The pre-processing involves parsing the data objects to determine a bounding box for the pixels of each data object as it would be represented in the bitmap memory (e.g., the size of the data object as it would appear in the bitmap memory). By so scanning the data objects representing a sheetside and noting the boundaries of all such objects (e.g., upper-left corner and opposing lower-right corner of the bounding box), a grid may be determined such that most or all boundaries of portions in bitmap memory align with the edge of some data object on that sheetside. Such alignment of portion boundaries to edges of data objects on the sheetside helps reduce the number objects that only partially cover a portion of the bitmap memory and thus improves efficiency in the processing of the data objects into meta-data representations. Edges of data objects that are close together may also be logically merged into a single edge in the pre-processing to further minimize the number of portions and hence the number of meta-data structures to be maintained. This optimization helps reduce the number of portions that may become "non-compact" because of overlapping data objects spanning multiple portions. These and similar optimizations to determine portion size are generally suggested by the teachings of U.S. Pat. No. 6,774,913. The '913 patent generally teaches similar pre-processing analysis for one-dimensional optimizations to determine "regions" (e.g., portions) along a scanline of the bitmap memory of an imaging system. Those of ordinary skill in the art will readily recognize extensions to the teachings of the '913 patent to extend the determinations to optimal two-dimensional portions of the bitmap memory. Further, those of ordinary skill in the art will recognize that the optimizations of step 302 need not be performed prior to processing each sheetside image but rather could be performed after processing of a pre-determined number of sheetside images so as to optimize the number and size of the portions (or may be omitted altogether such that the number and size of portions is static).

Prior to processing any data object, step 304 sets the type of data field of every meta-data structure to "compact" and the data indicator field is set to zero values (or other values representing a cleared state) to represent the cleared state of the bitmap memory at the start of generating a sheetside image (e.g., a "white" or "blank" sheetside image or a "cleared" sheetside image pre-set to a defined background color).

Processing of the sheetside image then continues at step 306 wherein the data object processor is operable to process the data objects corresponding to a sheetside image. The processing for each data object includes updating the meta-data structures for any corresponding portions of the bitmap that would be affected if data derived from the data object were to be written in the bitmap memory. The type of data field in each meta-data structure corresponding to an affected portion of the bitmap is updated to indicate the type of data now associated with the bitmap portion. The data indicator field for each meta-data structure corresponding to an affected portion of the bitmap is also updated to represent the new data object that is associated with the corresponding portion of the bitmap. Exemplary details of the processing of step 306 for determining which portions of the bitmap memory may be affected by processing of the data object and associated processing to update corresponding meta-data structures are discussed further herein below. In general, the type of data field is updated to indicate changes in the corresponding affected portion of the bitmap from a "compact" type of data to a "non-compact" type of data.

Following completion of processing of the data objects for a sheetside image at step 306, step 308 represents processing of the bitmap compressor of system 100 to generate a compressed bitmap data representation of the sheetside image. The bitmap compressor uses each meta-data structure to determine from the type of data field whether the compressed data may be generated exclusively from the information in the meta-data structure (e.g., for "compact" types of data) or whether the compressed data must be generated by reading the data stored in the corresponding portion of the bitmap memory (e.g., for "non-compact" type of data). Thus, processing of the bitmap compressor in step 308 further reduces bitmap memory bandwidth utilization by avoiding the need to read bitmap memory for portions containing non-"non-compact" types of data. Rather, for such "compact" types of data, the meta-data structure alone provides sufficient information for the bitmap compressor to generate compressed data representing the corresponding portion of the bitmap.

Completion of the processing of steps 302 through 308 thus generates a compressed bitmap representation of a sheetside image with reduced utilization of the bitmap memory bandwidth.

Figure 4:
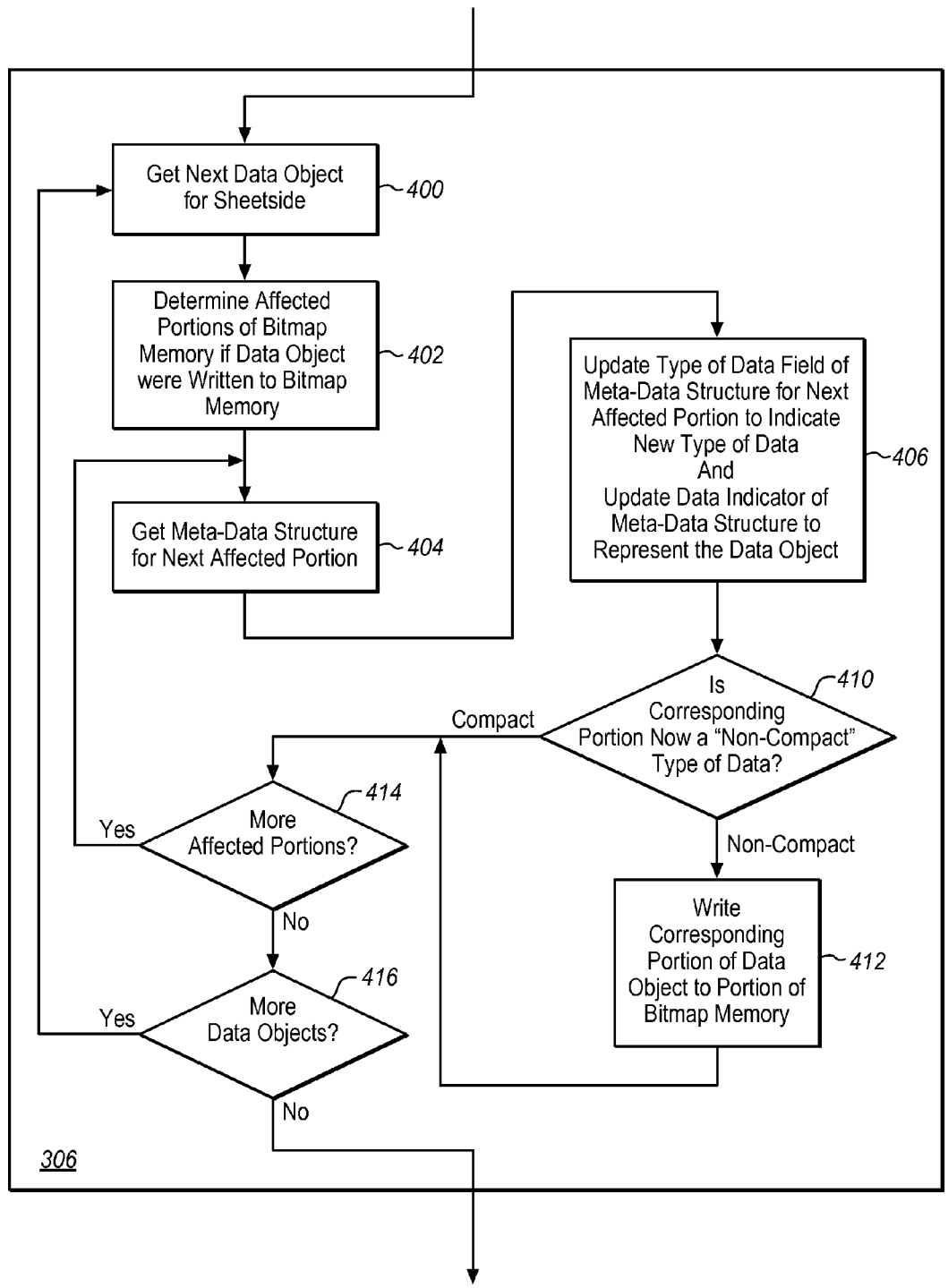
FIGS. 4 and 5 are flowcharts providing exemplary additional details of the processing of elements of FIG. 3 in accordance with features and aspects hereof.

FIG. 4 is a flowchart providing exemplary additional details of the processing of step 306 to process the data objects for a sheetside image. Step 400 gets the next (or first) data object for the sheetside image to be generated. Step 402 then determines which portions of the bitmap memory would be affected by the data object if the data object were written to the bitmap memory by standard bitmap processing techniques. The portions affected may be determined by comparing geometric parameters of the object (e.g., bounding box dimensions and position of the object on the bitmap) with the dimensions of the various portions. For each portion of the bitmap that would be affected by the data object, steps 404 through 414 are repeated.

Step 404 gets the next (first) meta-data structure corresponding to a next affected portion of the bitmap. Step 406 then updates the type of data field of the meta-data structure to indicate any change to the field in accordance with the particular data object. In addition, step 406 updates the data indicator of the meta-data structure to represent the data object being processed if the object is to be compactly represented in the meta-data structure. Exemplary additional details of processing of step 406 are discussed further herein below. In general, the data type field of the meta-data structure is updated to indicate "compact" if the affect of the data object on the corresponding portion of the bitmap memory will be compactly represented by the meta-data structure fields (in combination with the saved data object represented by the data indicator field). If the affect on the portion will not be compactly represented by the meta-data structure, the type of data field is updated to indicate a "non-compact" type of data and the affect of the data object is actually written to the corresponding portion of the bitmap (step 412 below). For example, overlaying certain data objects by other data objects may not be compactly represented (in some cases) and hence the data object is simply written to the corresponding affected portion of the bitmap memory. Or, as a matter of design choice certain objects or combinations of objects may be written to the bitmap for optimization consideration in a particular application. In still other exemplary conditions, portions or edges of a data object may cover only part of a portion of the bitmap. Again, as a matter of design choice such partial coverage of a portion by an object may or may not be represented by the corresponding meta-data structure. These and other heuristic decisions may be employed within the processing of step 406 to determine in what conditions the affected portion can be and will be represented compactly by the meta-data structure. Thus in step 406, a determination is made as to whether it is possible to compactly represent the affected portion and whether it is desirable to do so in a particular application. Step 410 then determines whether the meta-data structure type of data field has been updated to indicate a "non-compact" type of data. If so, step 412 writes the corresponding portion of the bitmap memory with the rasterized data derived from the data object. In either case, processing continues at step 414 to determine whether additional affected portions remain to be processed. If so, processing continues looping back to step 404 to process meta-data structures corresponding to other affected portions and processing of this data object. If not, step 416 next determines whether additional data objects remain to be processed for this sheetside image. If so, processing continues looping back to step 400 to retrieve and process a next data object for the current sheetside image. Otherwise processing of this sheetside image is completed.

Those of ordinary skill in the art will readily recognize that the processing of step 306 as further detailed by the method of FIG. 4 may be repeated for each of multiple bitmaps associated with color document presentation, highlight colors in a document presentation, MICR (magnetic imaging) processing, etc. Where such multiple bitmaps are used to define a sheetside image, a corresponding table of meta-data structures us associated with each bitmap and the processing described above is essentially duplicated for affected portions in each bitmap. In addition, those of ordinary skill in the art will recognize that in color processing, depending upon the color of the data object, portions in some bitmaps corresponding to certain of the primary colors may be affected while corresponding portions of other bitmaps may be unaffected by processing of a particular data object. Thus, the processing of element 306 may reduce bitmap memory bandwidth utilization differently for different bitmaps associated with the same sheetside image processing.

Figure 5:
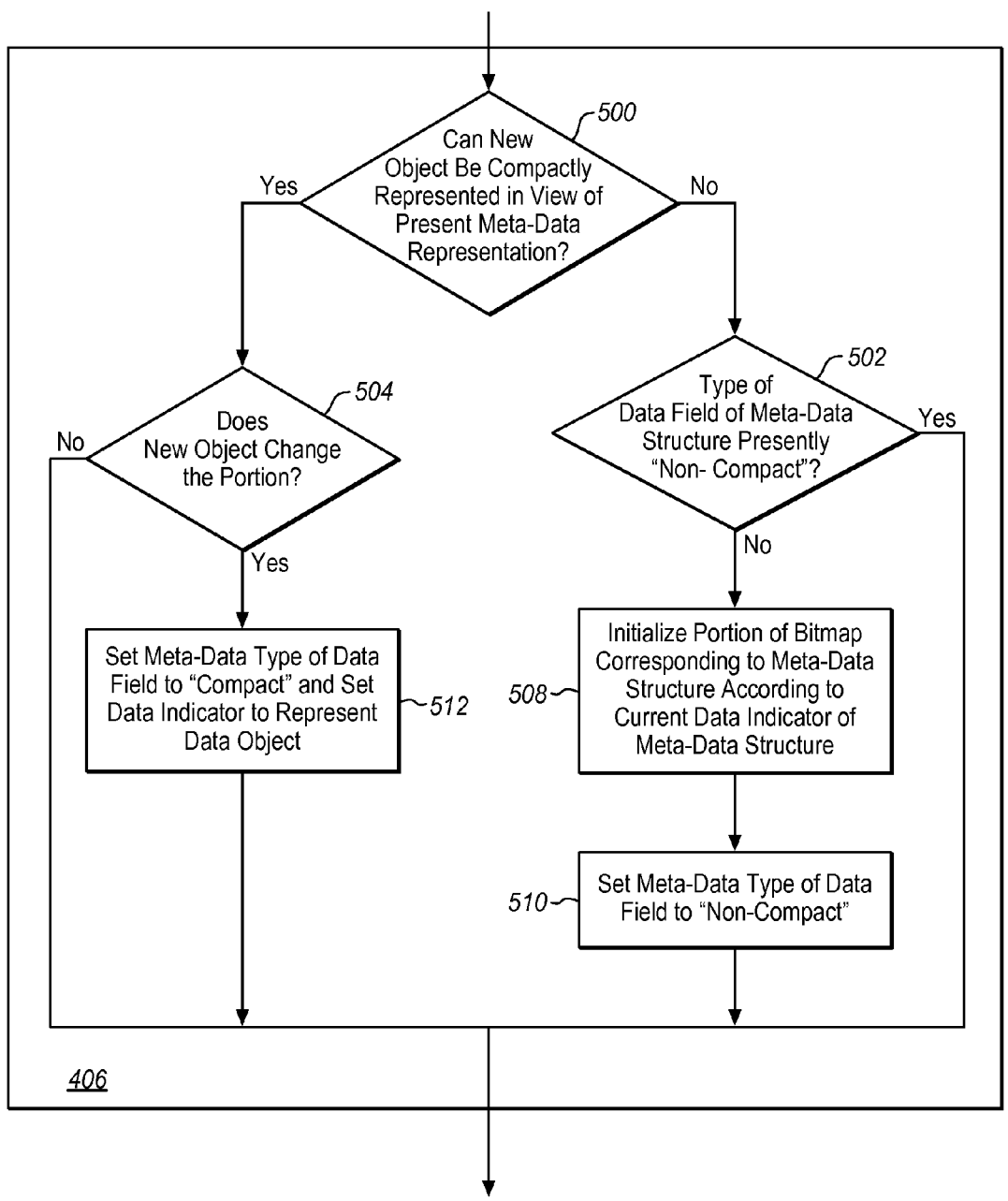

FIG. 5 is a flowchart describing exemplary additional details of the processing of element 406 of FIG. 4 to update a meta-data structure corresponding to a portion of the bitmap memory affected by the processing of a data object in a sheetside image. Step 500 first determines whether the affected portion will be compactly represented by the corresponding meta-data structure. As noted above, this determination may entail determining not only whether the affected portion can be represented compactly but also determining whether it is desirable to do so based on design choices in the implementation of features and aspects hereof. For example, it may be possible to compactly represent a portion of a bitmap even if the data object affects only part of the portion of the bitmap. Or, for example, it may be possible to compactly represent a portion of a bitmap even if multiple objects overlay one another in particular ways within the affected portion. These and other design choices as to whether a portion can/should be compactly represented will be readily apparent to those of ordinary skill in the art.

If the new object cannot be compactly represented by the meta-data structure, step 502 next determines whether the meta-data structure presently indicates that the corresponding portion is already written with data from one or more prior objects (i.e., already indicates a "non-compact" type of data in the meta-data structure). If so, processing is complete. If not, steps 508 and 510 change the type of data to "non-compact" and write all previously represented data objects to the affected portion of the bitmap. Specifically, step 508 first writes the data that is represented by the present meta-data structure to the corresponding portion of the bitmap memory. In other words, the currently represented "compact" type of data object/objects represented in the meta-data structure is/are written to the corresponding portion of the bitmap memory. Since these previously processed objects have not yet been written to the bitmap, they must be written to the affected portion before the data derived from the new data object is written in the affected portion. Step 510 sets the type of data to "non-compact" to complete processing of this meta-data structure and corresponding bitmap portion affected by the new data object.

If step 500 determines that the present meta-data structure indicates that the new object can be compactly represented by the meta-data structure (and if it is determined to be desirable as a matter of design choice), step 504 next determines whether the new object will affect a change of the affected portion. For example, if the meta-data structure indicates a "compact" type of data that indicates a solid color is represented and if the new data object does not change that color (e.g., because it is the same color or transparent), then the new object would not change the portion and processing is complete. If element 504 determines that the data object changes the meta-data representation of the corresponding portion, step 512 updates (sets) the type of data field to indicate a "compact" type of data and the data indicator field is set to represent the new data object (e.g., indirectly point to the saved data object or otherwise directly encode the data object in the data indicator field). Those skilled in the art will recognize that the present meta-data structure prior to updating according to the new object may represent either a "compact" or a "non-compact" type of data that may be changed into a new "compact" type of data representing the corresponding portion as affected by the new object. A current "compact" type of data representation may be changed to a "compact" type of data representation of the portion with affects from a different data object. Or, a current "non-compact" type of data representation of the portion may be updated to a "compact" type of data if the data object completely overwrites the pixels of the portion. Numerous other examples of updates to the meta-data representation to result in a new "compact" type of data representation of the corresponding portion will be readily apparent to those of ordinary skill in the art. Processing of this meta-data structure corresponding to an affected portion of the bitmap is then complete.

The affect a data object may have on one or more portions of the bitmap that it overlays depends on the particular semantic of the data object. Any of a variety of data objects may be encountered depending upon design choices in implementation of features and aspects hereof. In general all objects may be considered as a collection of pixels—each pixel having some value indicating a color and/or indicating a transparency value. In general, all objects are represented as a 2-dimensional array of such pixel values —e.g., a rectangular bounding box of pixel values. The value of a pixel may be encoded in a number of manners. For example, full color data objects may be defined as a pixel intensity value for each of three primary color planes and the color black. Or, for example, each pixel may simply encode an index value into a table of pre-defined colors (e.g., a palette). Further, each pixel value may encode a transparency level indicating that the pixel is transparent (i.e., has no color—no effect on the bitmap) or has some opaque color value (with the color specified by the value as indicated above).

Features and aspects hereof may be used with any and all such data object encodings and shapes. Exemplary operation of features and aspects hereof will be discussed in reference to one exemplary embodiment in which all data objects can be classified in one of four broad categories: rectangle, transparency mask, palette, and opaque image.

A "rectangle" is any data object that represents a rectangular area where the pixels of the rectangular area each represent a specified opaque color. Thus a rectangle object is typically defined by its geometric dimensions and a single color value. A rectangle may thus be compactly represented in a portion of the bitmap by a corresponding meta-data structure as a "compact" type of data where the data indicator field either points to the saved data object or encodes the dimensions and color of the rectangle.

A "transparency mask" is any data object (typically also rectangular in shape though not necessarily) where each pixel of the mask is either a "transparent" bit or an "opaque" bit of some specified color. This kind of data object is also sometimes referred to as a "bi-level image". Text is often represented as such a transparency mask. The glyph representing a character code or a sequence of such glyphs are represented as opaque pixels (all of the same color) against a bounding box background of transparent bits that do not affect the bitmap memory. When writing such a transparency mask to bitmap memory, the opaque pixels are written to the bitmap memory and the transparent pixels have no effect such that whatever was previously in the corresponding pixel locations of the bitmap memory remains unchanged. Typically the transparency mask is defined as a rectangular area with the transparent and opaque pixels defined therein. A transparency mask may thus be compactly represented in a portion of the bitmap by a corresponding meta-data structure as a "compact" type of data where the data indicator field points to the saved data object.

A "palette" is any data object that defines a shape (often a rectangular area) filled with one or more colors where the colors are selected from a limited set of colors (a palette). Thus, the colors are specified as index values in the relatively small range of palette values. In one exemplary implementation of such a palette object, one palette color index value is reserved to represent a "transparent pixel" and all other palette color index values represent other corresponding colors in the palette. A palette data object may thus be compactly represented in a portion of the bitmap by a corresponding meta-data structure as a "compact" type of data where the data indicator field points to the saved data object.

An "opaque image" data object is any object where each pixel is opaque and has a pixel value in a color spectrum. Photographic images are exemplary of such an opaque image object. An opaque image is typically defined as a rectangular area of such opaque pixel values. An opaque image may thus be compactly represented in a portion of the bitmap by a corresponding meta-data structure as a "compact" type of data where the data indicator field points to the saved data object. Further, the pixels of an opaque image object may be compressed and encoded according to a number of well known standards such as LZW and JPEG standards.

When data objects of these exemplary types are associated with portions by means of positioning the data object on a sheetside, the data object can be represented by a series of portions aligned with the portions of the underlying sheetside. Some affected portions of the bitmap memory are completely filled and some are only partially filled depending on the position of the data object on the sheetside. For example, a rectangle data object may be composed of portions only partially affected by the data object at a boundary of the rectangle (i.e., showing the edges of the rectangle) and solid portions (i.e., the center areas, completely filled by the rectangle). Similarly, other types of objects (e.g., opaque image data objects, transparency mask data objects, and palette data objects) may affect portions of the bitmap differently where the object completely fills a portion versus portions that are only partially affected by the data object at a boundary edge of the object. As noted above, such portions that are only partially affected by processing of a data object may none the less be compactly represented by the meta-data structure for that portion.

As data objects are processed to update meta-data structures corresponding to affected portions of the bitmap memory, combinations of data objects of the above types may be processed within any single affected portion—e.g., a sequence of objects may each affect a common portion each object overwriting or in some way adding to the pixels of the portion. As discussed above with respect to FIG. 5 the specific affect on a portion of the bitmap from processing a data object depends, in part, on the present type of data associated with the portion as indicated in the corresponding meta-data structure. In general, if an affected portion presently indicates a "compact" type of data in its corresponding meta-data structure, a next data object processed that completely fills the portion will typically retain the "compact" type of data but update the data indicator to represent the new object. If the new object only partially covers the portion that is currently compactly represented by a corresponding meta-data structure, then the type of data may be changed to "non-compact" to represent the mixture of the affects of the prior data object mixed with the partial affect of the new data object. If a "transparency mask" object is processed, its affect on any potion currently represented by a "compact" type of data meta-structure may depend on what the prior data object was. As can be seen from the above few examples, a variety of objects and combinations of objects may be represented compactly in the meta-data structure for an affected portion while other combinations of objects affecting a portion may require non-compact representation by writing to the bitmap memory portion.

The table below helps describe exemplary meta-data updates that may occur in the meta-data type of data field associated with an affected portion as data objects (such as the type noted above) affecting the portion are processed. Labels in the first column indicate the present meta-data type of data field value and parenthetically notes the data object that is presently, compactly represented by the meta-data structure (in the case of a "compact" type of data portion). The labels in the first row indicate a new data object being processed according to the exemplary types of objects discussed above. The intersecting cells of the table then define the updated type of data to be encoded in the corresponding meta-data structure for the affected portion and parenthetically note the new type of data object compactly represented in the updated meta-data structure. Those of ordinary skill in the art will recognize that the exemplary table below is not intended to present every possible transition or combination. For example, portions that are only partially affected by a new data object are not addressed by the table below. Thus the table below is intended merely to suggest some common types of data and combinations of object such that a table structure (e.g., a state transition table or a truth table) may define the various conditions that determine when a new data object causes a portion to be compactly represented by a meta-data structure or non-compactly represented by writing the data object directly to the affected portion of the bitmap.

|  | Rectangle Data Object | Transparency Mask Data Object | Palette Data Object | Opaque Image Data Object |
| --- | --- | --- | --- | --- |
| "Compact" (blank - e.g., cleared) | "Compact" (Rectangle) | "Compact" (Transparency Mask) | "Compact" (Palette) | "Compact" (Opaque Image) |
| "Compact" (Rectangle) | "Compact" (Rectangle) | "Non-compact" | "Non-compact" | "Compact" (Opaque Image) |
| "Compact" (Transparency Mask) | "Compact" (Rectangle) | "Non-compact" | "Non-compact" | "Compact" (Opaque Image) |
| "Compact" (Palette) | "Compact" (Rectangle) | "Non-compact" | "Non-compact" | "Compact" (Opaque Image) |
| "Compact" (Opaque Image) | "Compact" (Rectangle) | "Non-compact" | "Non-compact" | "Compact" (Opaque Image) |
| "Non-compact" | "Compact" (Rectangle) | "Non-compact" | "Non-compact" | "Compact" (Opaque Image) |

The above table exemplifies updating of an affected meta-data structure where the data object affects the entirety of the corresponding portion of the bitmap memory. Similar logic may be applied if a new data object only affects part of the portion corresponding to the meta-data structure. Or, in one exemplary embodiment, any affected portion that is only partially affected by a data object may be changed to "non-compact" so as to avoid complications of representing partial coverage of a portion by a data object. Still further, a meta-data structure may be provided that is adapted to compactly represent more than one data object in a portion. Thus other update processes may be added to the above exemplary updates to allow for certain combinations of data objects to be compactly represented in the meta-data structures. Those of ordinary skill in the art will recognize numerous other heuristic improvements and optimizations to avoid the need to write data objects directly to the bitmap memory and thus reduce bandwidth utilization.

Figure 6:
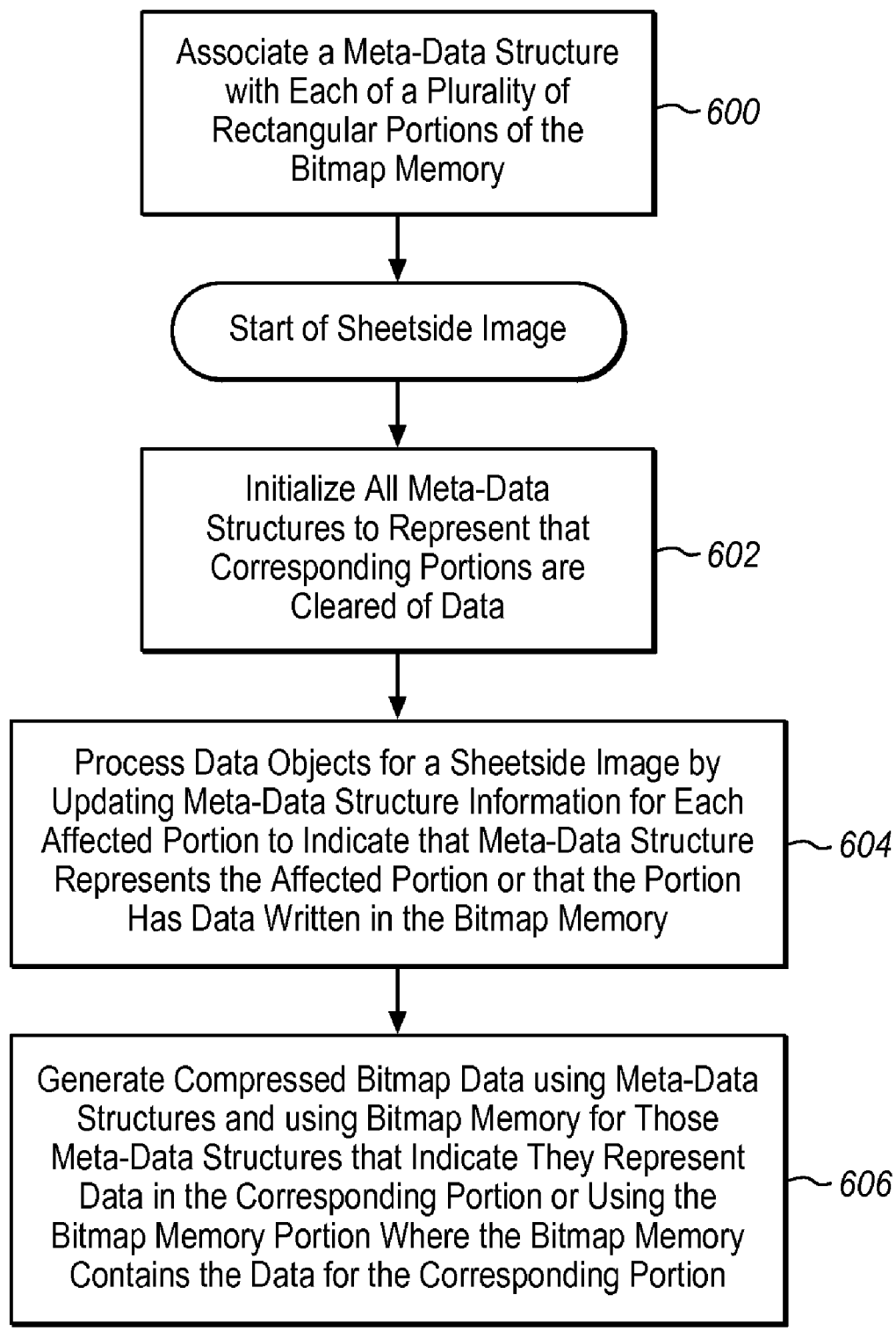
FIG. 6 is a flowchart describing another exemplary method in accordance with features and aspects hereof to process data objects representing a sheetside image utilizing meta-data structures to reduce bitmap memory bandwidth utilization when generating a compressed bitmap representation of each sheetside image.

FIG. 6 is a flowchart describing another exemplary method similar to that of FIG. 3 operable, for example, in system 100 of FIG. 1. Step 600 associates a meta-data structure with each of a plurality of portions of the bitmap memory. As above, the number of such portions, and hence the number of corresponding meta-data structures, may be statically predetermined or may be dynamically determined by optimization analysis in the processing of sheet side images. Prior to processing any data object, information in every meta-data structure is set by step 602 to represent a cleared state of the bitmap memory at the start of generating a sheetside image. This initial state in each meta-data structure may therefore represent a cleared bitmap (e.g., a "white" or "blank" sheetside image or a "cleared" sheetside image pre-set to a defined background color) without requiring writing of any bitmap memory.

Processing of the sheetside image then continues at step 604 wherein the data object processor is operable to process the data objects corresponding to a sheetside image. The processing for each data object includes updating information in the meta-data structures for any corresponding portions of the bitmap that would be affected if data derived from the data object were to be written in the bitmap memory. For example, the type of data field discussed above or other suitable indicia in each meta-data structure corresponding to an affected portion of the bitmap is updated to indicate whether the information in the meta-data structure adequately represents the data of the affected portion of the bitmap (i.e., without requiring writing of the bitmap memory) or whether the corresponding portion of the bitmap memory contains the data of the portion corresponding to the meta-data structure (i.e., because the meta-data structure does not adequately represent the affected portion). The data indicator field, as discussed above, is also updated to point to or otherwise represent the new data object that is associated with the corresponding portion of the bitmap. Exemplary additional details of the processing of step 604 for determining which portions of the bitmap memory may be affected by processing of the data object and associated processing to update information in corresponding meta-data structures are discussed further herein below.

Following completion of processing of the data objects for a sheetside image at step 604, step 606 represents processing of the bitmap compressor of system 100 to generate a compressed bitmap data representation of the sheetside image. The bitmap compressor uses each meta-data structure to determine from information therein whether the compressed data may be generated exclusively from the information in the meta-data structure as representing the corresponding portion of the bitmap memory or whether the compressed data must be generated by reading the data stored in the corresponding portion of the bitmap memory. Thus, processing of the bitmap compressor in step 606 further reduces bitmap memory bandwidth utilization by avoiding the need to read bitmap memory for portions that are adequately represented by the corresponding meta-data structure alone. Rather, for such compact representations of the data of the corresponding portion, the meta-data structure alone provides sufficient information for the bitmap compressor to generate compressed data representing the corresponding portion of the bitmap.

Completion of the processing of steps 602 through 606 thus generates a compressed bitmap representation of a sheetside image with reduced utilization of the bitmap memory bandwidth.

Figure 7:
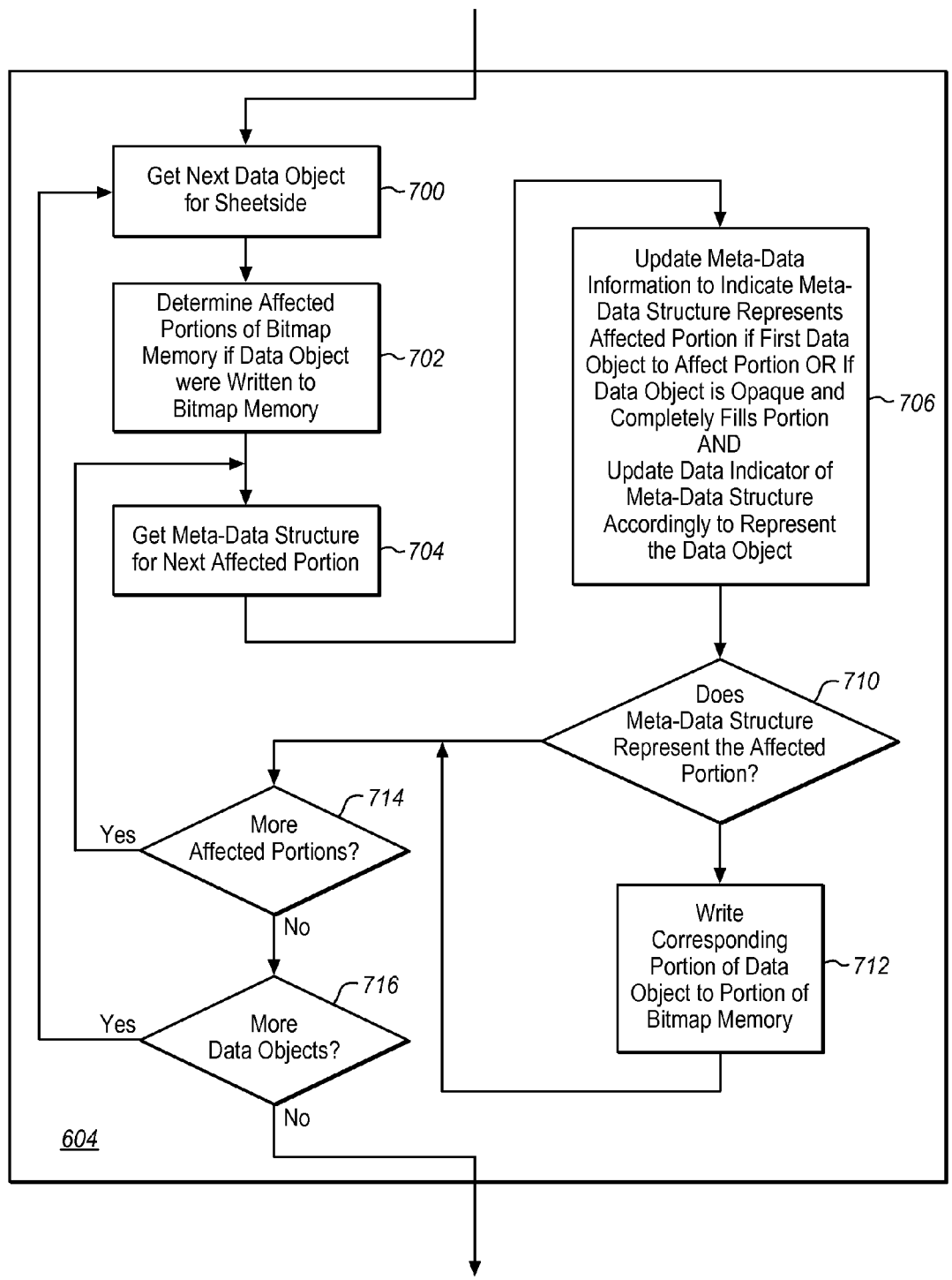
FIG. 7 is a flowchart providing exemplary additional details of the processing of elements of FIG. 6 in accordance with features and aspects hereof.

FIG. 7 is a flowchart providing exemplary additional details of the processing of step 604 to process the data objects for a sheetside image. Processing of the method of FIG. 7 is similar to that of FIG. 4 but expresses other exemplary embodiments of conditions where the meta-data structure may adequately represent the affected portion. Thus steps 700 through 704 and 714 through 716 are essentially identical to steps 400 through 404 and 414 through 416 of FIG. 4 above, respectively, to iteratively process each object by processing each affected portion for each data object.

Step 706 updates the information in the meta-data structure to indicate any change regarding whether the meta-data structure represents the corresponding portion of the bitmap in accordance with the affect of the particular data object being processed. In addition, step 706 updates the data indicator of the meta-data structure to represent the data object being processed. Numerous conditions may be evaluated as a matter of design choice to determine whether a meta-data structure can/should be used to represent the corresponding affected portion. In one exemplary, simplistic approach, information of the meta-data structure may be updated to indicate that the structure still represents the corresponding portion if the data object is the first data object to affect this corresponding portion. Further by way of example, even if this is not the first data object to affect the corresponding portion, the meta-data structure may none-the-less continue to represent the affected portion if the data object is all opaque pixels and completely covers the corresponding portion. In other words, if processing of the data object would affect the corresponding portion of the bitmap memory by writing every pixel in the portion to an opaque value, then the meta-data structure may adequately represent that affected portion in a compact format.

If the affect of the data object on the portion cannot be compactly represented by the meta-data structure (or should not be according to design choices of the design engineer), the meta-data information is updated by step 706 to indicate that the structure no longer represents the content of the corresponding portion and the affect of the data object will be actually written to the corresponding portion of the bitmap. Step 710 then determines whether the meta-data structure as updated by step 706 still adequately represents the content of its corresponding portion. If not, step 712 writes the corresponding portion of the bitmap memory with the rasterized data derived from the data object. In either case, processing continues at step 714 and 716 to continue processing of all portions affected by the present data object.

Figure 8:
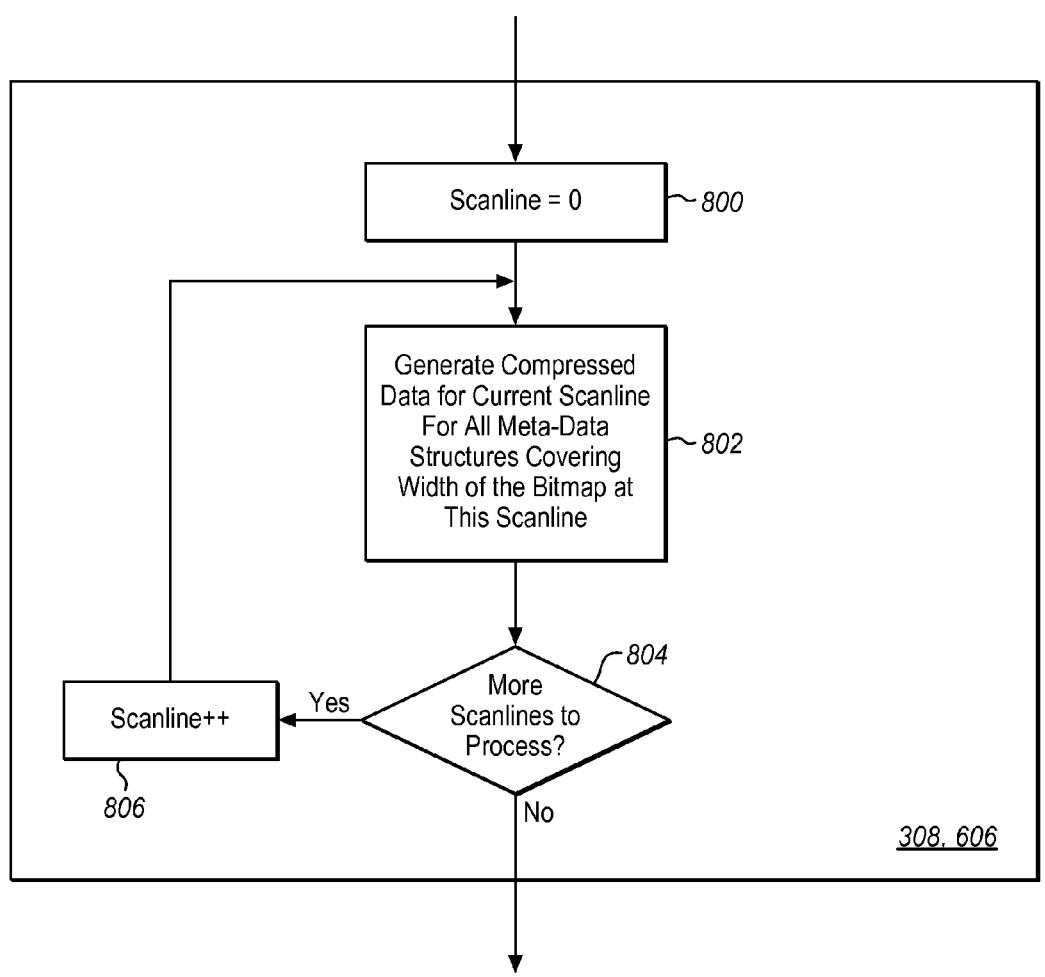
FIGS. 8 and 9 are flowcharts providing exemplary additional details of the processing to generate a compressed bitmap from meta-data structures generated by processing such as in FIGS. 3 through 7.

Following completion of processing of the data objects that represent a sheetside image, the bitmap compressor is operable to generate a compressed representation of the sheetside image using the meta-data structures and, for "non-compact" type of data, using the corresponding bitmap portions. FIG. 8 is a flowchart providing exemplary additional details of the processing of step 308 of FIG. 3 or of step 606 of FIG. 6 to generate a compressed bitmap representation of the sheetside image based on the meta-data structures and any raster data written into portions of the bitmap memory. The compressed data may be generated by stepping through each of the horizontal lines across the bitmap memory (e.g., each scanline) and generating compressed data from the meta-data structures that intersect each scanline.

Step 800 sets a scanline index to zero. Step 802 then generates compressed data for the presently indexed scanline using the meta-data structures representing portions of the bitmap that intersect the current scanline across the width of the bitmap memory. Step 804 then determines whether more scanlines remain to be processed. If so, step 806 increments the current scanline index and processing loops back to step 802 to process the next scanline.

In an exemplary embodiment, the compressed data is generated in either a "Run ends" or "PackBits" format—each well known encoding formats for compressed data encoding. "PackBits" and other well known encoding formats are published, for example, in "Graphics File Formats" by C. Wayne Brown and Barry J Shepherd (Manning Publications, p. 180, 1995). "Run ends" encoding is discussed, for example, in U.S. Pat. No. 4,610,027 (Anderson et al, assigned to IBM, issued Sep. 2, 1986). Where a scanline crosses from one portion (and corresponding meta-data structure) to a next adjacent portion of the bitmap (and its corresponding meta-data structure), the compressed data may continue its encoding as the data representing the portions is compressed either from the meta-data structures alone (with the saved data objects) or from the bitmap memory (i.e., for "non-compact" types of data). In one exemplary embodiment, the data objects processed by the systems and methods hereof may already be encoded as PackBits or Run ends compressed data in which case the generation of the compressed data may be as simple as copying or translating the already compressed data of the data object into the compressed data bitmap memory.

Figure 9:
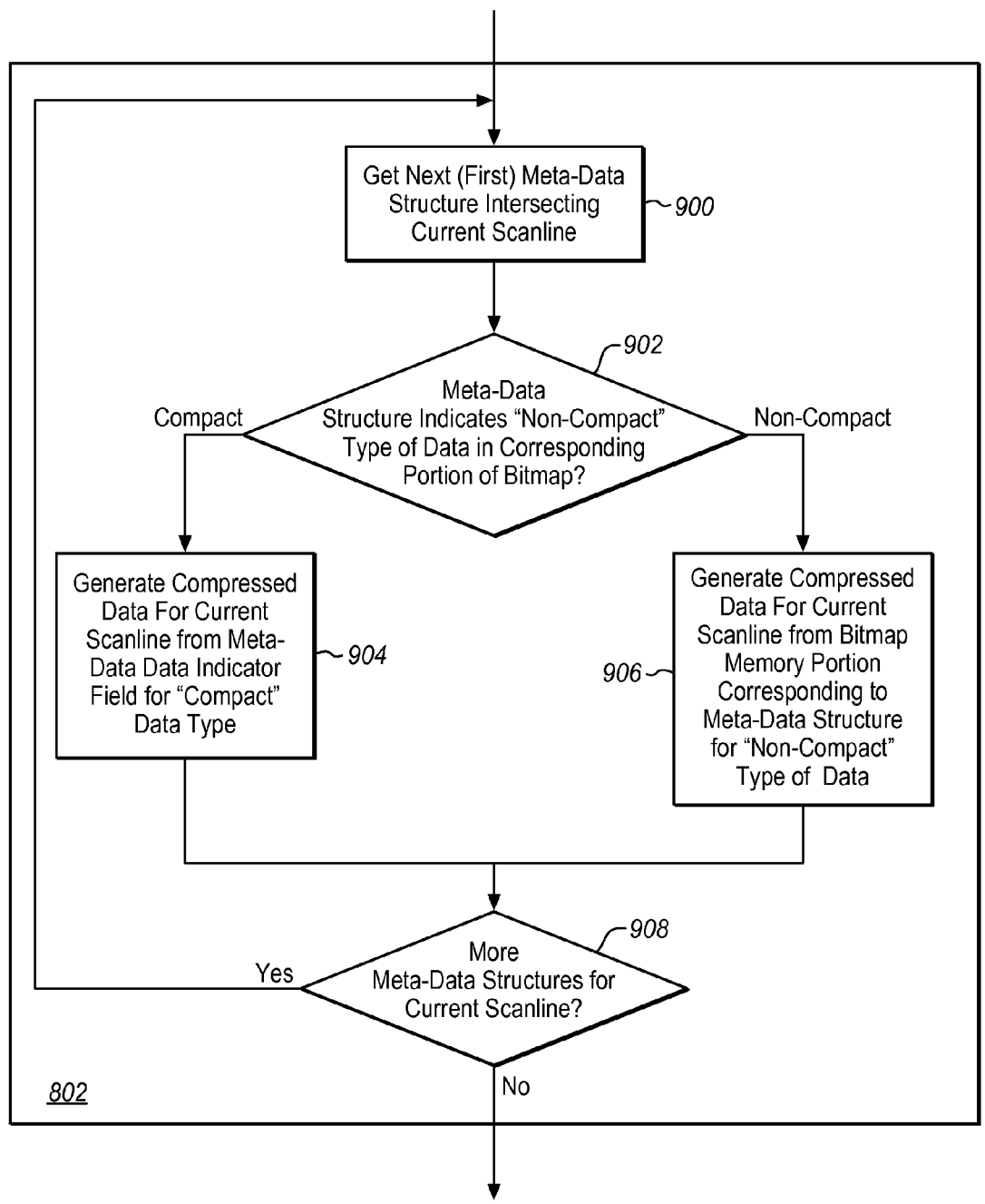

FIG. 9 is a flowchart providing exemplary additional details of the processing of step 802 of FIG. 8 to generate the compressed data for a current scanline from all meta-data structures that intersect the current scanline. Step 900 retrieves a next (or first) meta-data structure that intersects the current scanline. The scanlines that a meta-data structure intersects may be determined, for example, by simple indexing techniques to associate a meta-data structure with its corresponding portion of the bitmap memory and/or modulo arithmetic based on the total number of scanlines and the number of scanlines (e.g., height) of each portion. Element 902 then determines whether the meta-data structure represents the pixel data of the corresponding bitmap portion. If the meta-data structure adequately represents the corresponding bitmap portion, step 904 uses the meta-data structure to generate the compressed data from the corresponding portion. Else, step 906 generates the compressed data from the pixel data written in the bitmap memory portion corresponding to the meta-data structure.

As noted above, in one exemplary embodiment, the meta-data structure indicates a "non-compact" type of data is presently represented by the structure in the corresponding portion of the bitmap or indicates a "compact" type of data if the meta-data structure adequately represents the corresponding portion. If the meta-data structure type of data is "compact", step 904 generates compressed data for the compressed bitmap from the meta-data structure data indicator field. Where the type of data indicates the corresponding portion is "compact", the compressed data for the current scanline of the compressed bitmap is generated from the data of the meta-data structure alone using the data indicator as an indirect pointer to, or a direct representation of, the data to be compressed. Thus, step 904 reduces the bitmap memory bandwidth utilization by obviating the need for reading pixel data from the uncompressed bitmap when the meta-data structure indicates a "compact" type of data. Processing then continues at step 908 to determine whether more meta-data structures in the table intersect the current scanline and remain to be processed for this scanline of the sheetside image. If so, processing loops to step 900 to process a next data structure that intersects the current scanline. If step 902 determines that the current meta-data structure indicates a "non-compact" type of data in the corresponding portion of the bitmap, step 906 generates the compressed data for the compressed bitmap by reading pixel data from the bitmap memory portion corresponding to the meta-data structure and compressing the read pixel data to generate the compressed data of the compressed bitmap for the current scanline. As above, processing continues at step 908 to determine whether additional meta-data structures remain to be processed for this scanline of the sheetside image.

Although specific embodiments were described herein, the scope of the invention is not limited to those specific embodiments. The scope of the invention is defined by the following claims and any equivalents thereof.

What is claimed is:

1. A method for generating a compressed bitmap in a printing environment, the method comprising:

associating a meta-data structure with each portion of a plurality of portions of a bitmap memory wherein each meta-data structure includes a type of data field indicating a type of data associated with said each portion and wherein each meta-data structure includes a data indicator field indicating the data associated with said each portion;

processing a sequence of data objects defining the content of the bitmap memory wherein the processing of each data object includes:

determining which portions of the bitmap memory would be affected by the data object if written to the bitmap memory;

for each affected portion:

updating the type of data field of the meta-data structure associated with the affected portion to indicate that the type of data is a "compact" type or a "non-compact" type based on the data object and based on the current type of data;

updating the data indicator field of the meta-data structure to represent the data object when the type of data field is updated to indicate a "compact" type of data; and writing a corresponding portion of the data object into the affected portion of the bitmap memory when the type of data field is updated to indicate a "non-compact" type of data; and for each meta-data structure:

determining if the meta-data structure indicates a "non-compact" type of data;

responsive to a determination that the meta-structure indicates a "non-compact" type of data, generating compressed data of the compressed bitmap from data in the corresponding portion of the bitmap memory; and responsive to a determination that the meta-data structure does not indicate a "non-compact" type of data, generating compressed data of the compressed bitmap based on the data indicator field of the meta-data structure.

2. The method of claim 1 further comprising:

defining the plurality of portions by logically dividing the bitmap memory into a plurality of rectangular portions.

3. The method of claim 2 wherein the size of the rectangular portions is statically determined.

4. The method of claim 2 wherein the size of the rectangular portions is dynamically determined prior to the step of processing based on the sequence of data objects.

5. The method of claim 4 further comprising
pre-processing the sequence of data objects to determine a preferred number of rectangular portions and the size of each of the rectangular portions prior to the step of processing.

6. The method of claim 1 wherein the step of updating to indicate a "non-compact" type of data further comprises:
determining whether the meta-data structure prior to updating presently indicates a "compact" type of data; and
responsive to determining that the meta-data structure presently indicates a "compact" type of data, writing the corresponding portion of the bitmap memory to store the data indicated by the current "compact" type of data prior to updating the type of data indication to indicate "non-compact" type of data.

7. The method of claim 1 wherein the step of updating to indicate a "compact" type of data further comprises:
determining whether the affect of the data object on the corresponding portion will change any data represented by the corresponding portion and whether meta-data structure prior to updating presently indicates a "compact" type of data; and
responsive to determining that the data object will change data represented by the current portion and that the meta-data structure presently indicates a "compact" type of data, writing the corresponding portion of the bitmap memory to store the data indicated by the current "compact" type of data prior to updating the type of data indication to indicate "non-compact" type of data.

8. The method of claim 1 further comprising:
initializing all meta-data structures to indicate a "compact" type of data and a data indicator representing a cleared portion of the bitmap prior to processing the sequence of data objects.

9. Apparatus for generating compressed bitmaps in a printing environment, the apparatus comprising:
a bitmap memory for representing a sheetside image;
a table containing a plurality of meta-data structures wherein each meta-data structure is associated with a corresponding portion of the bitmap memory and wherein each meta-data structure includes a type of data field and a data indicator field;
a data object processor adapted to process data objects representing a sheetside image wherein each data object, if written to the bitmap, would cause data to be written in affected portions of the bitmap memory,
wherein the data object processor is adapted to update the type of data field of each meta-data structure corresponding to each affected portion of the bitmap memory to indicate either a "compact" or a "non-compact" type of data that would be written to the corresponding portion of the bitmap memory by processing of a data object,
wherein the data object processor, responsive to updating the type of data field to indicate a "compact" type of data, is further adapted to update the data indicator field of each meta-data structure corresponding to each affected portion of the bitmap memory to represent the data object, and
wherein the data object processor is adapted to write information from processing of the data object to said affected portions of the bitmap memory for each meta-data structure updated to indicate "non-compact" type of data; and
a bitmap compressor adapted to generate a compressed bitmap representation of the sheetside image from the meta-data structures and the bitmap memory
wherein the bitmap compressor is adapted to generate compressed data based on the data indicator field for each meta-data structure indicating a "compact" type of data, and
wherein the bitmap compressor is adapted to generate compressed data from the bitmap memory for each meta-data structure indicating a "non-compact" type of data.

10. The apparatus of claim 9
wherein each meta-data structure is associated with a corresponding rectangular portion of the bitmap memory and wherein the size of each rectangular portion is statically determined.

11. The apparatus of claim 9 further comprising:
an optimizer coupled to the table and coupled to the data object processor and adapted to dynamically determine the size of each rectangular portion prior to processing the data objects.

12. The apparatus of claim 11 wherein the optimizer is adapted to pre-process the sequence of data objects to determine a preferred number of rectangular portions and the size of each of the rectangular portions prior to processing of the sequence of data objects.

13. The apparatus of claim 9
wherein the data object processor is adapted to write a corresponding portion of the bitmap memory according to a presently indicated "compact" type of data in the corresponding meta-data structure prior to writing said portion of the bitmap memory from the data object that caused updating of said corresponding meta-data structure from a "compact" type of data to a "non-compact" type of data.

14. The apparatus of claim 9
wherein the data object processor is adapted to initialize the type of data field of each of said plurality of meta-data structures to indicate a "compact" type of data and a data indicator representing a cleared portion of the bitmap prior to processing any data objects for a sheetside image.

15. A method for generating a compressed bitmap representation of an uncompressed bitmap memory generated from a plurality of data objects, the method comprising:
defining a plurality of rectangular portions in an uncompressed bitmap memory;
associating a different meta-data structure with each portion of the uncompressed bitmap memory;
processing the plurality of data objects wherein the processing of each data object includes:
determining which portions of the uncompressed bitmap memory the data object may affect; and
for each affected portion:
determining from information currently in the corresponding meta-data structure whether the affect of the data object on the portion can be represented by information in the corresponding meta-data structure without writing to the portion;
responsive to determining that the portion can be represented without writing to the portion, updating information in the meta-data structure to represent the portion as affected by the data object; and
responsive to determining that the portion cannot be represented without writing to the portion, updating information in the meta-data structure to indicate that the meta-data does not represent the portion and writing data derived from the data object to the portion;

generating a compressed bitmap based on the meta-data structures corresponding to the plurality of portions and using the bitmap memory for any of the portions for which the corresponding meta-data structure indicates that the portion is not represented by the meta-data structure; and outputting the compressed bitmap for presentation to user.

16. The method of claim 15 wherein each meta-data structure includes information indicating that its corresponding portion represents either a "compact" type of data or a "non-compact" type of data, the method further comprising:

initializing, prior to processing the plurality of data objects, information in each meta-data structure to indicate that its corresponding portion is a "compact" type of data, wherein the step of determining whether the affect of the data object can be represented by the corresponding meta-data structure further comprises determining whether the meta-data structure information represents the portion as a "compact" type of data or whether the meta-data structure information does not represent the portion and thus indicates a "non-compact" type of data, wherein the step of updating the meta-data structure to indicate that the meta-data structure represents the portion further comprises changing the meta-data information to indicate a "compact" type of data, and wherein the step of updating the meta-data structure to indicate that the meta-data structure does not represent the portion further comprises changing the meta-data information to indicate a "non-compact" type of data.

17. The method of claim 15 wherein the step of determining whether the affect of the data object can be represented by the corresponding meta-data structure further comprises determining whether the data object is the first data object to affect the portion corresponding to the meta-data structure, wherein the step of updating the meta-data structure to indicate that the meta-data structure represents the portion further comprises changing the meta-data information to indicate that the data object has affected the corresponding portion, and wherein the step of updating the meta-data structure to indicate that the meta-data structure does not represent the portion further comprises changing the meta-data information to indicate that the portion includes data written from the affects of one or more previously processed data objects.

18. The method of claim 15 wherein each data object is totally opaque or is partially transparent, wherein the step of determining whether the affect of the data object can be represented by the corresponding meta-data structure further comprises determining that the data object is opaque and completely fills the portion or determining from the meta-data structure that the data object is the first data object to affect the corresponding portions, wherein the step of updating the meta-data structure to indicate that the meta-data structure represents the portion further comprises changing the meta-data information to point to the data object, and wherein the step of updating the meta-data structure to indicate that the meta-data structure does not represent the portion further comprises changing the meta-data information to indicate that the portion includes affects of one or more prior data objects.

\* \* \* \* \*